United States Patent

Natsuno

[11] Patent Number: 5,805,355
[45] Date of Patent: Sep. 8, 1998

[54] RESIN LENS

[75] Inventor: Yasuyuki Natsuno, Hachioji, Japan

[73] Assignee: Konica Corporation, Japan

[21] Appl. No.: 619,427

[22] Filed: Mar. 21, 1996

[30] Foreign Application Priority Data

Mar. 29, 1995 [JP] Japan ................................ 7-071570

[51] Int. Cl.$^6$ ........................................................ G02B 3/02
[52] U.S. Cl. ................................................ 359/719; 359/642
[58] Field of Search ..................................... 359/719, 642; 428/65.1; 525/329.5, 329.7, 330.3

[56] References Cited

U.S. PATENT DOCUMENTS

| | | | |
|---|---|---|---|
| 4,395,516 | 7/1983 | Imai et al. | 525/71 |
| 5,138,001 | 8/1992 | Ueda et al. | 526/262 |
| 5,183,870 | 2/1993 | Fukushima et al. | 526/273 |
| 5,467,225 | 11/1995 | Manabe | 359/719 |

Primary Examiner—Georgia Y. Epps
Assistant Examiner—Jordan M. Schwartz
Attorney, Agent, or Firm—Jordan B. Bierman; Bierman, Muserlian and Lucas

[57] ABSTRACT

A lens made of an acrylic resin for use in a laser optical system for an optical disk, in which the acrylic resin has the following characteristics;

refractive index (n): $n \geq 1.5$,
percentage of water absorption (W): $0 \leq W \leq 1.5\%$, and
thermal deformation temperature (T): $T \geq 110°$.

The lens satisfies the following expression:

$$0 \leq (d \times h)/|R_1 \times R_2| \times W \leq 2$$

where n represents a refractive index of the acrylic resin, W represents a percentage of water absorption of the acrylic resin, T represents a thermal deformation temperature of the acrylic resin, while d represents an on-axis thickness of the lens, $R_1$ represents a radius of curvature on an optical axis of the first surface (mm) of the lens, $R_2$ represents a radius of curvature on the optical axis of the second surface (mm) of the lens, and h represents an effective diameter (mm) on an incident side of the lens.

8 Claims, 8 Drawing Sheets

RESIN LENS

BACKGROUND OF THE INVENTION

The present invention relates to a resin lens, and specifically to a resin lens for use in a laser optical system of an optical disk.

Recently, resin lenses are used for the most part of lenses for optical disks. However, these resin lenses have characteristics in which their optical performance temporarily changes as the ambient relative humidity changes, and further the heat resistance property of resin lenses is less than that of glass lenses. Accordingly, the lens material for optical disks is changed depending on their purpose, or there are occasions in which only expensive glass lenses are used.

Recently, optical disks are used in various ways such as CDs (compact disks), VDs (optical video disks), MOs (magneto-optical disks), MDs (mini-disks), and DVDs (digital video disks). Although these disks have some mechanical differences, laser beams are collected on the disk, and signals are read from the reflected light. Laser beams are collected by an objective lens, and in this case, the diameter of a spot of the laser beams is approximately 1 µm, requiring a lens of extreme accuracy.

In the beginnings of CD development, the lens was composed of a plurality of glass lenses, which was very expensive. However, recently, one or two resin lenses are used, or one glass lens is coupled with another resin lens. Accordingly, these lenses are relatively inexpensive compared with a lens which is composed of a plurality of glass lenses.

Inexpensive acrylic resin, for example, TE-301 made by Mitsubishi Rayon Co., or OZ-1000 made by Hitachi Kasei Co., is commonly used in resin lenses for optical disks. These acrylic resin lenses for optical disks have characteristics in which the heat resistance temperature is lower, a birefringence amount is larger, and the change of optical performance due to environmental humidity change (hereinafter, referred to as humidity characteristics) is greater than glass lenses. Therefore, its effective range is limited. Accordingly, countermeasures to replace one material with another one depending on the purpose of use, are taken.

For example, in cases of resin lenses for optical disks for vehicles, the environmental temperature is often very high during the summer, and the heat resistance temperature of approximately 85° C. is required. Accordingly, higher heat resistant acrylic resins are used for this purpose, however, since the birefringence is greater, and the water absorption coefficient is also higher, the humidity characteristics are also quite insufficient and their effective range is limited.

Further, since signals from MO or MD disks are discriminated by the direction of polarization of light of the reflected light from the disk, the birefringence amount greatly influences the performance. Accordingly, a resin having a smaller birefringence amount is required. However, since the heat resistance temperature is lowered when solving this problem by the use of conventional resins, the effective range is limited.

There are non-acrylic resins in which the heat resistance property and the humidity characteristics are increased, for example, Zeonex 480 by Nihon Zeon Co. However, its material cost is higher and its birefringence amount is greater than those of acrylic resins. Therefore, special molding procedures are required, resulting in lowered productivity and higher cost.

Problems with the conventional acrylic resins and nonacrylic resins are as follows. In the case of acrylic resins, birefringence is greater and humidity characteristics are insufficient in high heat resistant resins, and conversely the heat resistance property is insufficient in humidity resistant resins. In the case of non-acrylic resins, high heat resistance property and low water absorption property are attained, however, the birefringence is very high and the productivity is low, resulting in higher cost.

SUMMARY OF THE INVENTION

The present invention is proposed to solve the above-described problems. That is, an object of the present invention is to provide low cost and high performance resin lenses for use in a laser optical system for optical disks, using low cost acrylic resins.

The above object is attained by resin lenses for use in the laser optical system for optical disks, which are characterized in that: acrylic resins with the following performance characteristics are used; and the resin lens is shaped to satisfy the following arithmetic relationship 1.

Refractive index (n): $n \geq 1.5$

Percentage of water absorption (W): $0 \leq W \leq 1.5\%$

Thermal deformation temperature (T): $T \geq 110°$ C.

$$0 \leq (d \times h)/|R_1 \times R_2| \times W \leq 2$$

Where the following symbols are used:

d: on-axis thickness (mm)

$R_1$: radius of curvature (mm) on the axis of the surface S1 (for any of the spheric, or aspheric surfaces)

$R_2$: radius of curvature (mm) on the axis of the surface S2 (for any of the spheric, or aspheric surfaces)

h: effective diameter (mm) (the effective diameter on the incident side)

BRIEF DESCRIPTION OF THE DRAWINGS

FIG. 9(A) shows a lens in which the photoelasticity constant is large, and FIG. 9(B) shows a lens of the present invention.

DETAILED DESCRIPTION OF THE PREFERRED EMBODIMENT

Referring to FIGS. 1 to 12, an embodiment of the present invention will be described below.

FIGS. 1(A) and 1(B) are views showing resin lenses for use in a laser optical system for an optical disk according to the present invention. FIG. 1(A) is a view showing one example, and FIG. 1(B) is a view showing another example. Codes of dimension lines in FIGS. 1(A) and 1(B) are the same as those in the arithmetic relationship 1.

The high temperature in the case of CDs for vehicles at which a lens for an optical disk is usable, is approximately 85° C. Accordingly, glass lenses, high heat resistant acrylic resin lenses, or non-acrylic resin lenses with high heat resistance and low water absorption percentage are used for vehicle CDs. High heat resistant acrylic resin has a large birefringence amount and a high saturation water absorption percentage. Accordingly, its usable range is limited. Non-acrylic resin lenses with high heat resistance and low water absorption percentage, for example, Zeonex 480 by Nihon Zeon Co. has a higher material cost and a larger birefringence amount than those of acrylic resins. Therefore, a special molding process is required, resulting in lower productivity and higher production cost. Further, the cost of glass lenses is also very high.

Resins with a smaller birefringence index and a low water absorption percentage, for example, OZ-1000 by Hitachi Kasei Co., has an insufficient heat resistance temperature, and therefore, can not be used for heat resistant vehicle CDs. Accordingly, in the conventional technology, it is necessary to replace the current material with others depending on the purpose.

Humidity characteristics and heat resistance property will be described below.

Humidity Characteristics

In resin lenses for optical disks, when relative humidity around the lens varies, water is gradually absorbed or dehumidified from the lens surface and the inner refractive index becomes temporarily nonuniform. Therefore, for example, spherical aberration in the optical performance varies. This variation is shown in FIG. 2.

Figure 1:
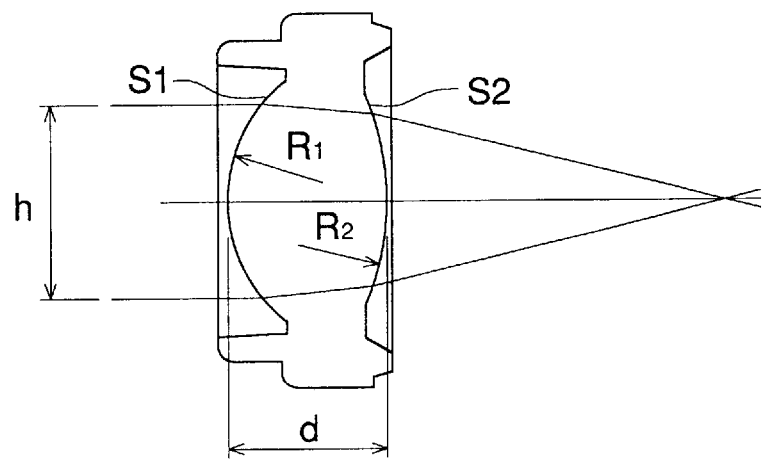
FIGS. 1(A) and 1(B) are views showing resin lenses according to the present invention.
Figure 1:
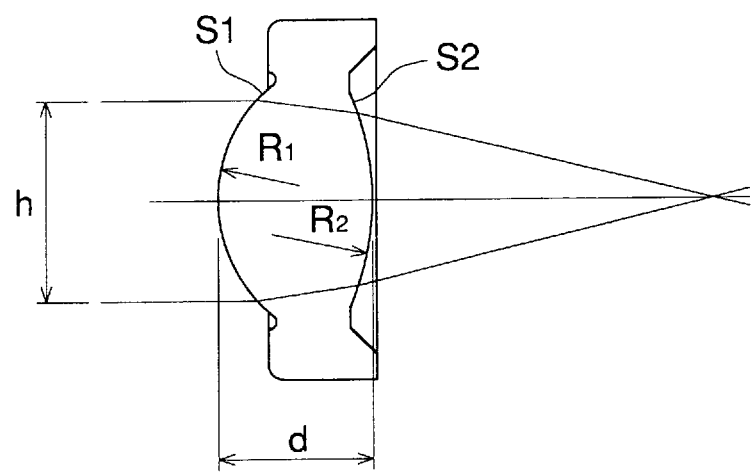
Figure 2:
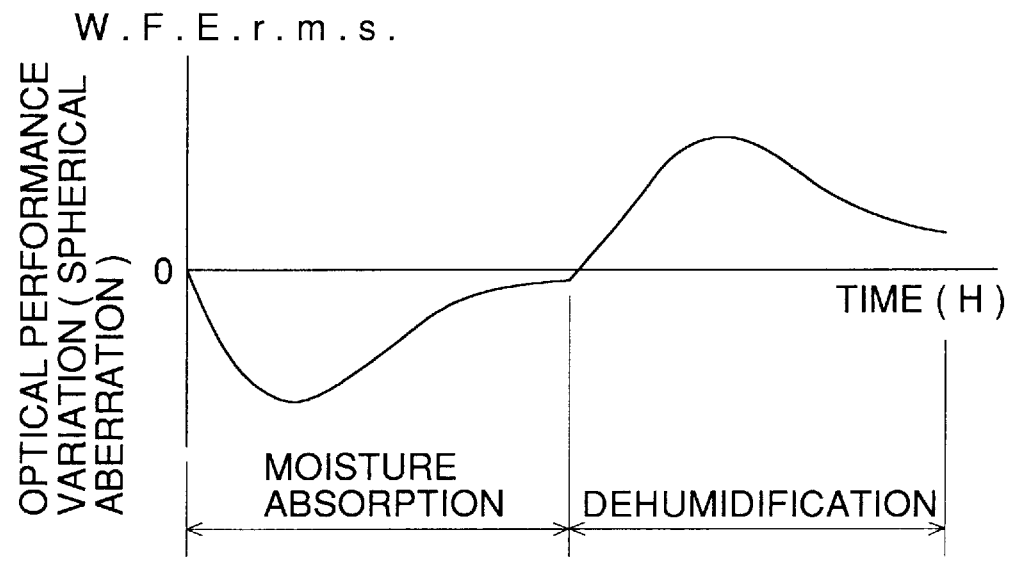
FIG. 2 is a graph showing optical performance variations when humidity is varied.

As shown in FIG. 2, the variation of the optical performance (spherical aberration) returns to its initial condition after a certain period of time, which is almost the same as for water absorption and dehumidification. However, the time necessary to restore the variation to the initial condition, requires normally almost two weeks to one month. Accordingly, although the optical performance is not overly affected by the humidity variations of the seasons, the variation of the optical performance (spherical aberration) appears as shown in FIG. 2 when humidity varies suddenly or environmental conditions suddenly vary due to relocation, or the like.

The present inventors found that the maximum amount of variation (X) of the optical performance during water absorption and dehumidification depends on the water vapor pressure equivalent to the relative humidity variation (hereinafter, it is referred to as the difference of water vapor pressure), and the amount of the optical performance variation is constant when the difference exceeds a certain value.

Figure 3:
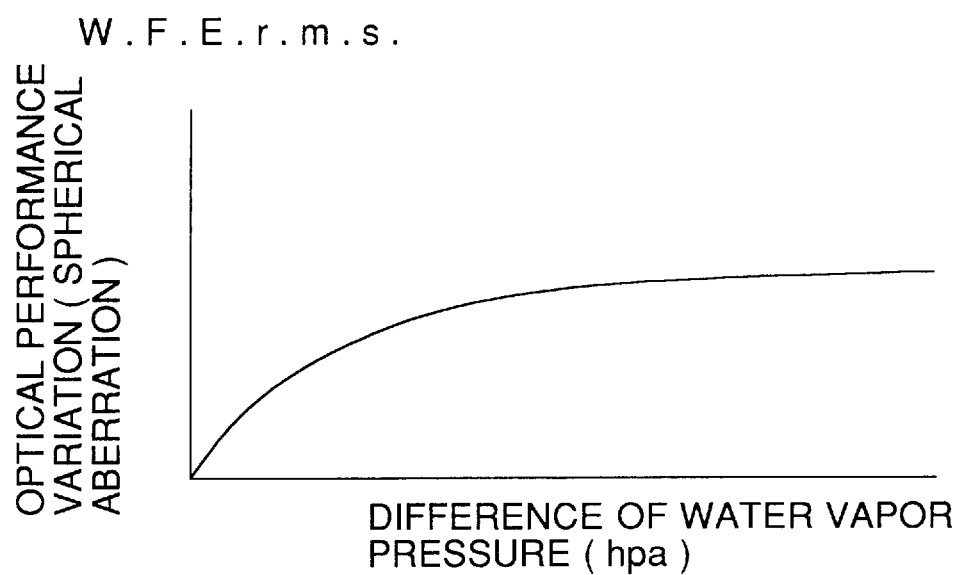
FIG. 3 is a graph showing the difference of water vapor pressure and optical performance variation.

This difference of water vapor pressure (hPa) is determined as follows. For example, the difference of water vapor pressure (hPa) is 12.67 hPa when the relative humidity is varied from 90% at 60° C. to 50% at 25° C. FIG. 3 is a graph showing the relationship of the difference of water vapor pressure and the optical performance variation (spherical aberration). As can clearly be seen from FIG. 3, the optical performance variation (spherical aberration) approaches a constant when the difference of the water vapor pressure (hPa) is larger than a certain value. This optical performance variation is approximately determined depending on the percentage of water absorption and the shape of the material.

The maximum amount of optical performance variation (X) when humidity varies, is determined depending on the percentage of water absorption of the material when the shape is the same, and is expressed by X=B×W. Where, W is the percentage of water absorption and B is a constant, and therefore, W is proportional to X.

The maximum amount of optical performance variation (X) is determined depending on the shape of the lens when the same material is used. In nonuniform distribution in the lens, which occurs due to water absorption or dehumidification, it becomes clear in the inventor's consideration that a distribution in the direction of the optical axis does not affect the optical performance much. That is, the present inventors found the following: the thinner the lens is, and the larger the radius of curvature is, the smaller the optical performance variation is, when the same material is used; when high refractive index material is used, the radius of curvature is reduced, so that the value of (R1×R2) can be increased; therefore, the value of the arithmetic relationship 1 can be reduced; and accordingly, when the arithmetic relationship 1 is reduced, that is, $(d \times h/|R_1 \times R_2|)$ is reduced, the optical performance variation can be reduced.

When the same specification is applied to the lenses, the shape of the lens is determined mostly by the following relationship 2.

$$1/f = (n-1) \times (1/R_1 - 1/R_2) + [(n-1)^2/n] \times d/(R_1 \times R_2) \qquad 2$$

That is, the shape of a lens is determined by a refractive index n, radii of curvature $R_1$ and $R_2$ of lens surfaces $S_1$, and $S_2$, and the lens thickness d. Accordingly, the humidity characteristic of a resin lens for the optical disk is determined by the shape of the lens and the percentage of water absorption of the used resin. It is preferable that the refractive index n is larger, however, in practice, it is preferably not more than 2. As a result, the present inventors found that a desirable resin lens can be obtained when the above-described material is used and the shape of the lens satisfies the arithmetic relationship 1.

The results of the experiments are as follows.

| Value of the arithmetic relationship 1 | Amount of the optical performance change ($\lambda$ = 632.8 nm) |
| --- | --- |
| 0 | 0 $\lambda$ |
| 1.45 | 0.055 $\lambda$ |
| 2.2 | 0.074 $\lambda$ |
| 2.46 | 0.083 $\lambda$ |

That is, the present inventors found the following. When the resin material having a refractive index of more than 1.5 and a percentage of saturation water absorption of less than 1.5%, which is measured according to ASTM D-542 (American Society for Testing and Material), is used, and the arithmetic relationship 1 is satisfied, and when the difference between the thickness of both lens surfaces in the direction of the optical axis is made to be relatively smaller, then, a resin lens for the optical disk having good humidity characteristics is obtained.

Figure 4:
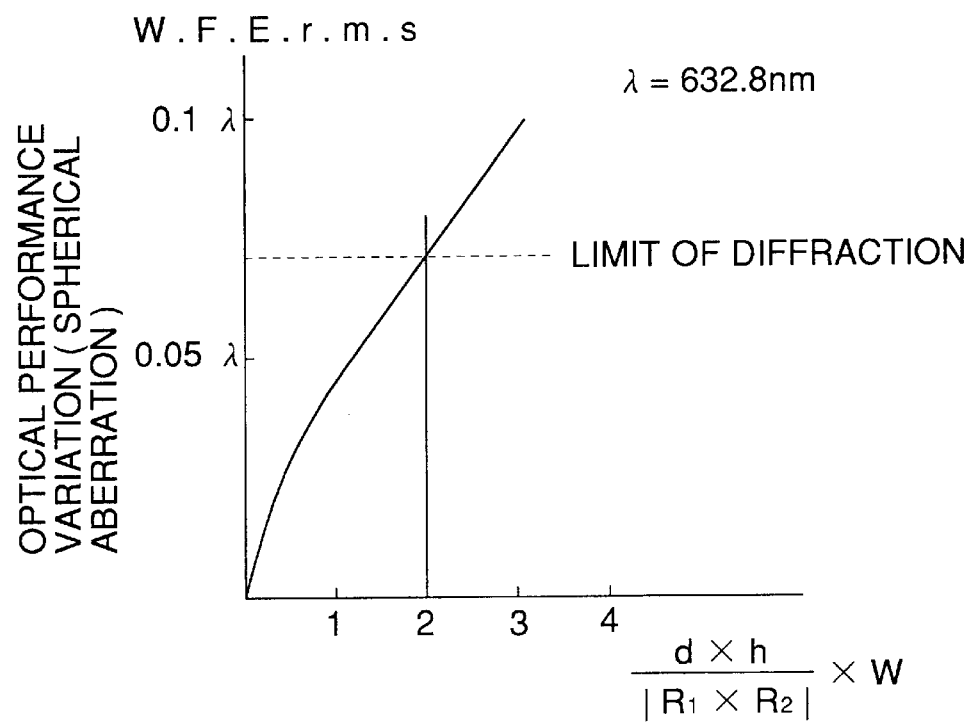
FIG. 4 is a graph showing the relationship between the arithmetic relationship 1 and the optical performance variation.

A graph of the relationship 1 and the optical performance variation (spherical aberration) at the time of water absorption and dehumidification, is shown in FIG. 4. In FIG. 4, when the value of the relationship 1 is less than 2, the spherical aberration of the optical performance variation (spherical aberration) is almost less than 0.07 $\lambda$ and less than the limit of diffraction, and since diffraction phenomenon does not occur, it can collect the laser beams.

Figure 5:
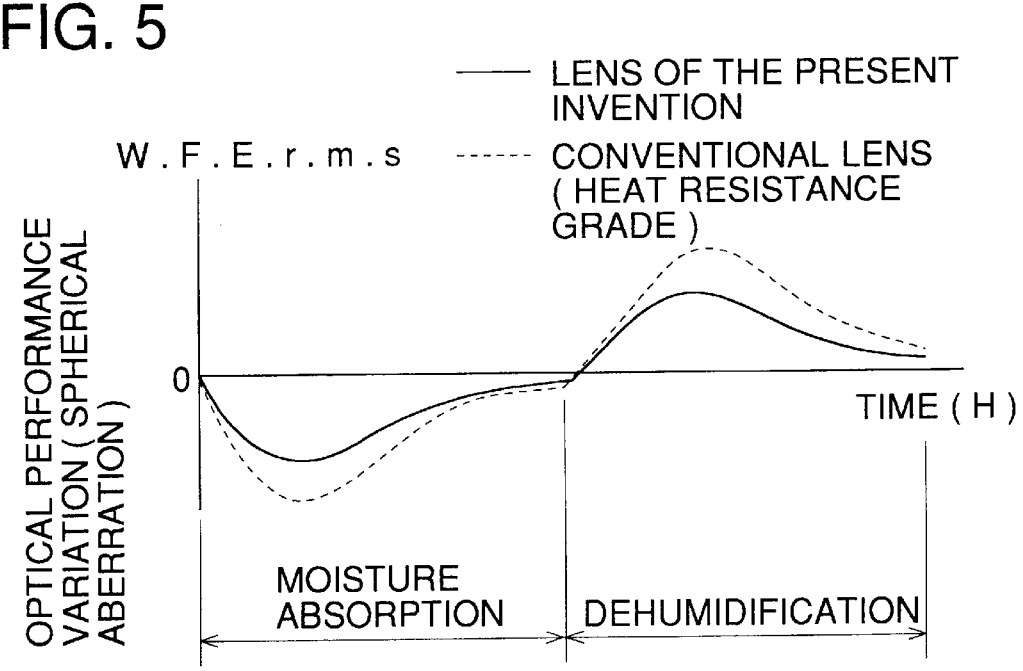
FIG. 5 is a graph showing humidity characteristics of lenses.

FIG. 5 shows humidity characteristics of the conventional lens (using heat resistant grade resin) and the lens of the present invention, at the time of water absorption and dehumidification. As shown in FIG. 5, influences due to humidity of the lens of the present invention are much smaller than that of the conventional lens.

Heat Resistance Property

The heat resistance temperature of the resin lens for optical disks is smaller than that of glass lenses, or the like. This is due to the difference between the thermal deformation temperatures of each material.

Thermal deformation of the resin lenses occurs when the resin is softened and the internal strain is released, as temperature around the material rises. Since the resin lens is generally formed by injection molding, the amount of strain of the lens interior varies depending on molding methods or molding conditions. However, in order to stably form the resin lenses for optical disks with extremely accurate molding, it is necessary to take countermeasures so that molding conditions do not vary, under limited conditions. The amount of strain in the interior of each lens is considered to be almost constant under these specified stable conditions.

If the amount of strain of the lens interior is constant, the heat resistance property (Y) depends on the thermal deformation temperature (T) of the material and is expressed by $Y = C \times T$. Where, C is a constant, and Y is proportional to T.

Figure 6:
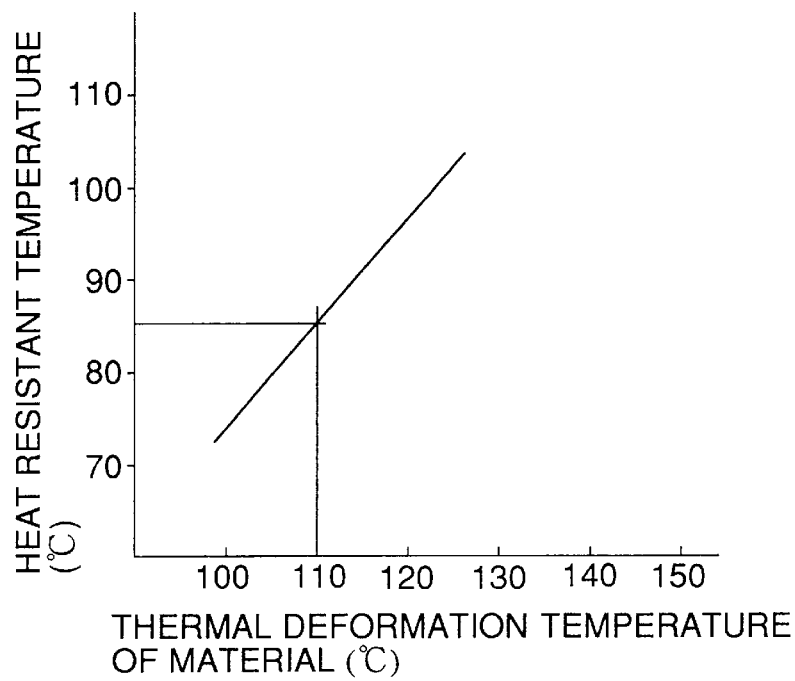
FIG. 6 is a graph showing the thermal deformation temperature and the heat resisting property of a specific material.
Figure 7:
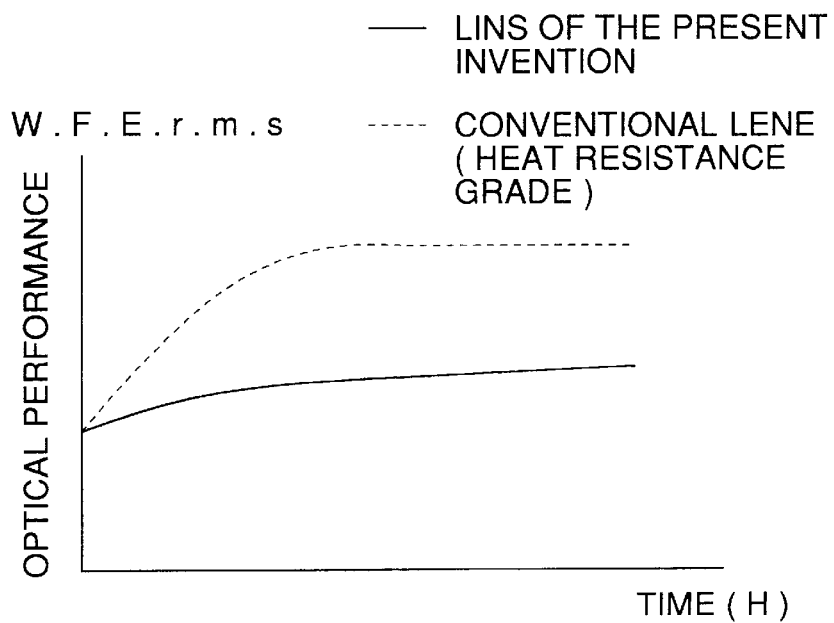
FIG. 7 is a graph showing results of a heat run test.

In order to obtain 85° C. heat resistance temperature of the resin lens, a resin having heat resistance temperature of not less than 110° C. as defined by ASTM D-648, may be used. FIG. 6 shows the thermal deformation temperature of the resin and the heat resistance temperature of the resin lens. As shown in FIG. 6, when the resin material having the thermal deformation temperature of not less than 110° C. is used, it is clear that the heat resistance temperature of the lens formed of this resin material is not less than 85° C. FIG. 7 shows graphs of a heat resistant test (maintained at 85° C.) of the conventional lens (a humidity resistant grade resin is used) and the lens of the present invention. As shown in FIG. 7, changes of the optical performance of the lens of the present invention are smaller and more stable than those of conventional lenses.

As described above, the humidity characteristics and the heat resistance property, which were problematic in resin lenses for optical disks made of, specifically, an inexpensive acrylic resin are improved, and desirable humidity characteristics and the heat resistance temperature of 85° C. are obtained.

Next, the numerical aperture of the lens will be described.

As the numerical aperture on the emitting side (hereinafter, referred to as NA on the emitting side) of an object resin lens for the optical disk, the following values are respectively necessary at the wavelength $\lambda = 780$ nm: approximately 0.45 for a CD, approximately 0.5 for a VD, and 0.55–0.6 for an MO and MD. Recently, a short wavelength laser has been developed, and a laser with a wavelength $\lambda = 630$ nm or the like is being produced. The numerical apertures necessary in this case, are as follows: approximately 0.36 for a CD, 0.4 for a VD, 0.44–0.48 for an MD, and 0.49 for a DVD.

Figure 8:
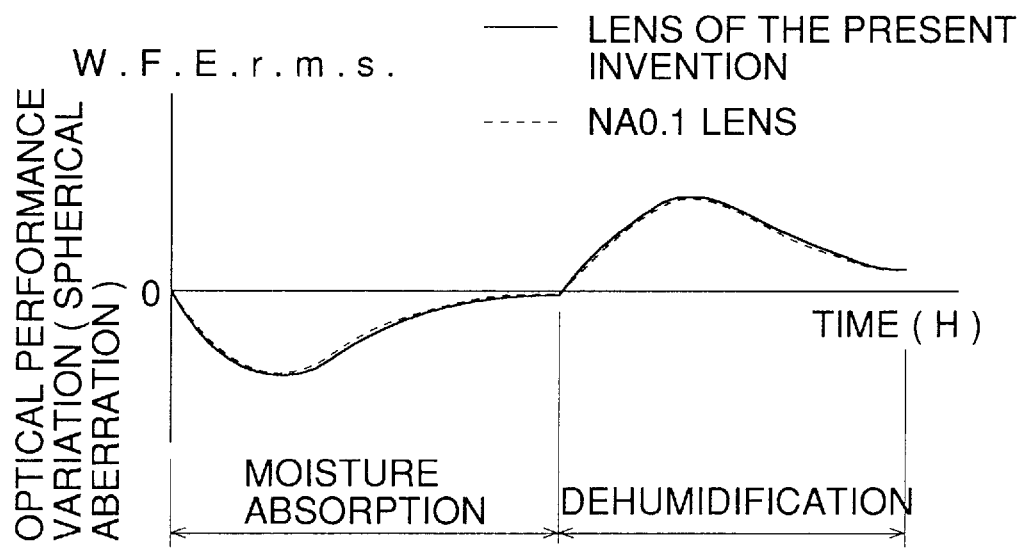
FIG. 8 is a graph showing humidity characteristics depending on the numerical aperture.
Figure 9:
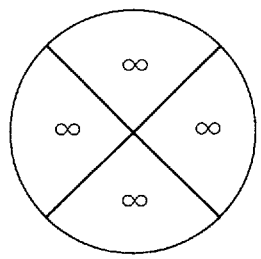
FIGS. 9(A) and 9(B) show birefringence amounts obtained by the Senarmont method, depending on the photoelasticity constant.
Figure 9:
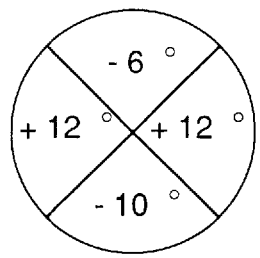

As the numerical aperture (NA) of the object resin lens for the optical disk becomes larger, the value of relationship 1 becomes larger, and humidity characteristics become undesirable. However, if the NA on the emitting side is not more than 0.3, the humidity characteristics are practically no problem even when the NA value does not satisfy the above-described three inequalities $n \geq 1.5$, $0 \leq W \leq 1.5\%$, $0 \leq [(d \times h)/[R_1 \times R_2]] \times W \leq 2$. FIG. 8 shows the humidity characteristics of a lens having an NA of 0.1 and the lens of the present invention, and there is almost no difference between the two lenses. Since a practical NA on the emitting side of about 0.3–0.7 is necessary, it is essential to satisfy the above-described three inequalities in this NA range. When the NA is 0.3–0.7, and the above-described three inequalities are satisfied, the increase of the humidity characteristics of the lens is conspicuous and a cost of the lens is relatively inexpensive.

Next, the heat resistance property of a lens will be described.

As described above, in order to increase the heat resistance temperature of the object lens for the optical disk to not less than 85° C., it is preferable that the thermal deformation temperature of the material is not less than 110° C., as stipulated in ASTM D-648. However, when the thermal deformation temperature of the material is excessively high, it is necessary to increase the temperature of the metallic mold or the cylinder temperature of the molding machine, resulting in a shortened metallic mold life or unacceptable molding efficiency. Accordingly, this results in higher production cost and a more expensive lens. When the thermal deformation temperature of the material is not more than 125° C., according to ASTM D-648, it was found by the present inventors that the lens can be produced by the same molding methods as normal methods.

Accordingly, it becomes clear that the heat resistance temperature of the lens is not less than 85° C., and the lens can be produced inexpensively, when the resin having a thermal deformation temperature between 110° C. and 125° C. including 110° C. and 125° C., according to ASTM D-648, is used.

The thermal deformation temperature and the moldability, heat resistive property of the lens and production cost of the lens are shown in Table 1.

TABLE 1

| Thermal deformation temperature | Moldability | Heat resistance property | Production cost |
|---|---|---|---|
| Not less than 125° C. | B | A | C |
| Not less than 110° C. and not more than 125° C. | A | B | A |
| Not more than 110° C. | B | C | B |

A: Excellent, B: Good, C: Poor

As shown in Table 1, an increase of the moldability and heat resistance property of the lens is obvious, and production cost is low, when an acrylic resin, having a thermal deformation temperature between 110° C. and 125° C. including 110° C. and 125° C., is used.

Next, the birefringence amount of the lens will be described.

A signal from a magneto-optical disk such as an Mo or an MD is read in the direction of the polarized laser light reflected from the disk. in this case, when the birefringence amount of the object lens is large, the polarized direction of the laser light is erroneously discriminated, for example, resulting in unacceptable characteristics such as jittering. Therefore, an expensive glass lens or a resin lens using a low birefringence material is used for the objective lens for the MO or MD. However, because the heat resistance property of the resin lens using a low birefringence material is also low, devices, for which such a lens can be used, are limited.

The birefringence amount of a resin lens for an optical disk using the Senarmont method, is determined approximately depending on the photoelasticity constant and the distortion amount inside the lens.

The birefringence amount (Z) of the lens is expressed as Z=D×C×S. Where, D is a constant, C is the photoelasticity constant of a material, and S is the distortion amount inside the lens. FIG. 9(B) shows the birefringence amounts in the Senarmont method of a lens of the present invention in which the resin material having a photoelasticity constant of not more than $6 \times 10^{-13}$ cm$^2$/dyne is used. FIG. 9(A) shows the birefringence amounts in the Senarmont method of a lens in which a resin material having a larger photoelasticity constant is used. As shown in FIGS. 9(A) and 9(B), the lens of the present invention has a small birefringence amount, which is acceptable. However, a lens in which the absolute value of the photoelasticity constant=0, is the most preferable lens, and a lens having a large photoelasticity constant is entirely inappropriate for use.

Figure 10:
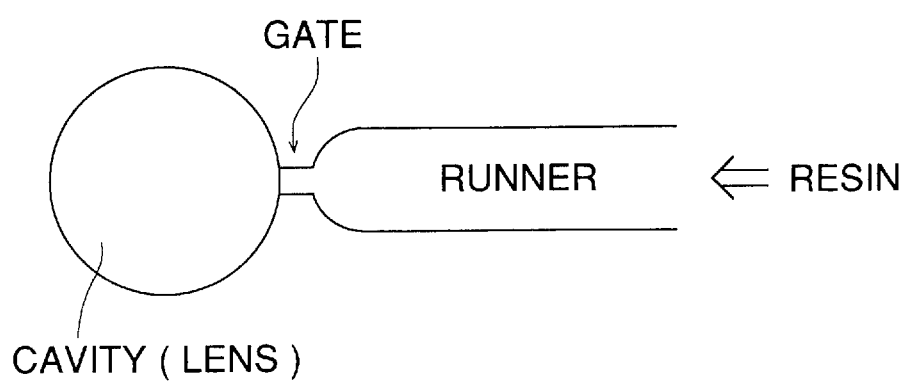
FIG. 10 is a view which explains a gate in an injection molding process of a resin lens of the present invention.

As shown by the view explaining the gate in FIG. 10, in injection molding processes, it is necessary to provide an entrance which channels resin into a cavity so that the fused resin completely fills the metallic mold. This filling entrance for the resin is called a gate.

Since each resin has its peculiar viscoelastic characteristics, the elastic modulus change depends on temperature. In the processes in which the fused resin is filled from a cylinder of a molding machine to a sprue of the metallic mold, to a runner, to the gate, and further to the cavity, since a portion of the resin, with which the metallic mold surface is in contact, is solidified, the resin flows in the vicinity of the center of the metallic mold. Shearing occurs in the vicinity of the border between the solidified portion and the flowing portion, and heat is generated by the shearing. Accordingly, when the resin filling speed is increased, the heat created by the shearing is increased, and resin temperature is increased, resulting in a decrease of the viscosity.

Because the gate is the entrance to fill the resin into the cavity, when the cross sectional area of the gate is changed, the temperature or viscosity of the resin changes even if the filling speed is the same. Therefore, filling circumstances of the resin to the cavity can be changed, thus the internal stress of molded products can also be changed.

Figure 11:
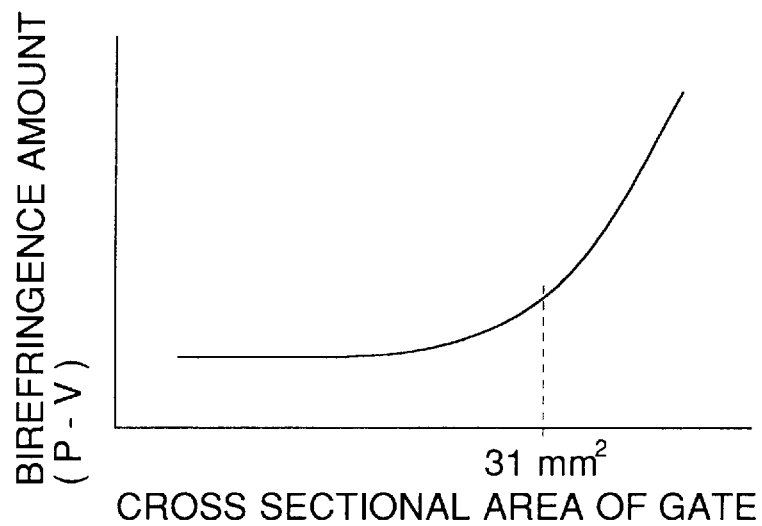
FIG. 11 is a graph showing the relationship between a gate cross sectional area and the birefringence amount.

It was found that a resin lens for the optical disk having desirable characteristics for a lens for an MO or an MD is obtained when a material having a photoelasticity constant of not more than $6 \times 10^{-13}$ cm$^2$/dyne is used and its gate sectional area is not more than 3.1 mm$^2$ so that the birefringence amount becomes smaller. In FIG. 11, the relationship of the gate sectional areas and birefringence amounts of such lenses is shown. As shown in FIG. 11, it can be found that the birefringence amount suddenly increases when the gate sectional area exceeds approximately 3.1 mm$^2$.

As described above, the birefringence amount of a resin lens for an optical disk can be reduced when material having a photoelasticity constant of not more than $6 \times 10^{-13}$ cm$^2$/dyne is used. Further, the interior distortion can be reduced when the gate sectional area is not more than 3.1 mm$^2$, so that the birefringence amount is greatly reduced.

Figure 12:
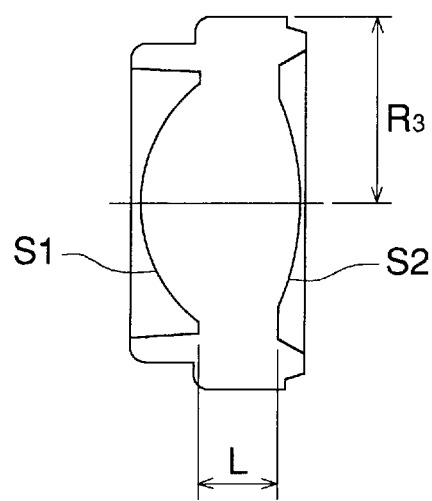
FIG. 12 is a view explaining $R_3$ and L dimensions.

As described above, satisfactory characteristics are obtained when a material having a photoelastic constant of not more than $6 \times 10^{-13}$ cm$^2$/dyne is used as a resin object lens for a magneto-optical disk such as an MO, MD, or the like, and the dimension of a gate is not more than 3.1 mm$^2$. However, the present inventors found that the birefringence amount is further reduced when the gate sectional area is changed depending on the lens volume. Herein, a lens volume (V mm$^3$) is defined by the following relationship: $V=(R_3)^2 \times \pi \times L$. Where, $R_3$ is the outer radius of the lens (radius:mm), $\pi$ is a ratio of the circumference of a circle to its diameter, and L is the minimum thickness in the direction of the optical axis of a lens (mm). $R_3$ and L are shown in FIG. 12.

Figure 13:
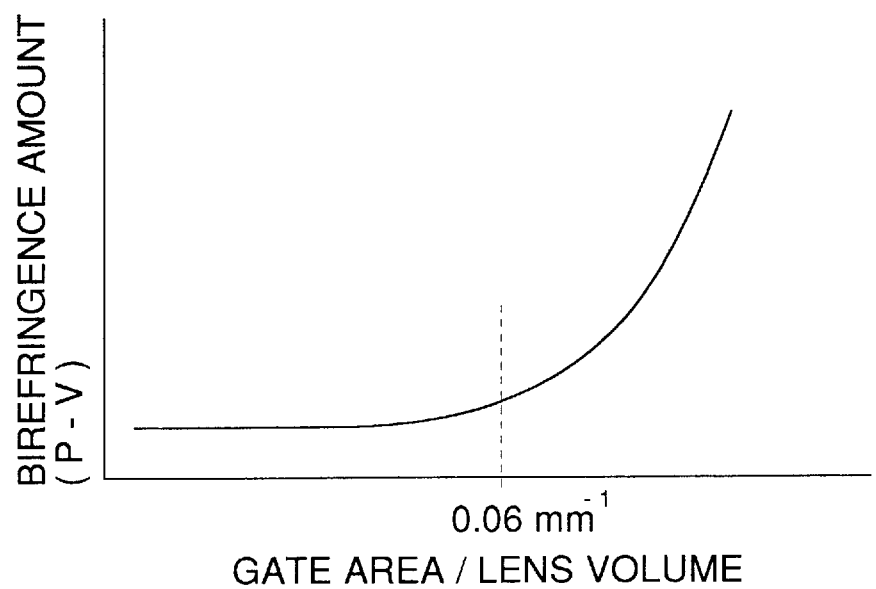
FIG. 13 is a graph showing the relationship between (the cross sectional area/lens volume) and the birefringence amount.

Due to this finding, the birefringence amount can be greatly reduced when (the gate sectional area/the lens volume) is not more than 0.06 mm$^{-1}$. FIG. 13 shows the relationship between (a gate sectional area/a lens volume) and a birefringence amount. As shown in FIG. 13, it is clear that the birefringence amount becomes suddenly large from a portion at which (a gate sectional area/a lens volume) exceeds 0.06 mm−1. As an object lens for an magneto-optical disk, the smaller the birefringence amount is, the more excellent are the lens characteristics, for example, such as jittering.

As described above, when (the gate sectional area/the lens volume) is not more than 0.06 mm$^{-1}$, the internal distortion of the lens is greatly reduced and the aforesaid effects become conspicuous, and the birefringence amount is greatly reduced.

Next, the melt flow rate of the resin material will be described.

It is necessary that resin lenses for optical disks are very accurate and their cost is low, compared with glass lenses. Therefore, countermeasures are taken for each molding condition, and further, ambient conditions for the lens are controlled, so that uniform molding is realized. In order to obtain excellent optical performance and to reduce lens molding variation of the optical performance, a material, having a melt flow rate which is between 4 (g/10 minutes) and 11 (g/10 minutes) including 4 and 11 (g/10 minutes) when the melt flow rate is measured according to ASTM D-1238, may be used. When the melt flow rate is not more than 4, the fluidity of the material in a metallic mold is lowered, and for example, the material does not fill the entire metallic mold. When the melt flow rate is not less than 11, for example, jetting occurs and scratches, or the like, occur on the lens surface. Further, when countermeasures are taken for these problems depending on molding conditions, then, the optical performance is not satisfied, or molding variations become excessive. Accordingly, it is essential to use a material having a melt flow rate which is between 4 (g/10 minutes) and 11 (g/10 minutes) including 4 and 11 (g/10 minutes).

As described above, a lens, which is highly accurate and of high quality, can be produced when there is used a material in which the melt flow rate is between 4 and 11 including 4 and 11.

The first effect of the present invention is as follows. In a resin lens for optical disks, especially, in resin lenses for optical disks using a low cost acrylic resin, problems of humidity characteristics and the heat resistance property are reduced, and satisfactory humidity characteristics and a heat resistance property of 85° C. can be obtained.

The second effect of the present invention is as follows: the above-described effect can be more conspicuous.

The third effect of the present invention is as follows: the birefringence amount of the resin lens for the optical disk can be reduced.

The fourth effect of the present invention is as follows: the internal distortion of the resin lens for the optical disk can be reduced, and thereby, the birefringence amount can also be greatly reduced.

The fifth effect of the present invention is as follows: a lens, which is highly accurate and of stable quality, can be produced.

As described above, according to the present invention, a high performance resin lens used for a laser optical system for an optical disk can be provided at a low cost, using an inexpensive acrylic resin.

What is claimed is:

1. A lens for use in a laser optical system for an optical disk, comprising:

(a) a first non-planar refractive surface facing the optical disk; and (b) a second non-planar refractive surface opposite to the first surface, wherein said lens is made of an acrylic resin which has the following characteristics:

$n \geq 1.5$ $0 \leq W \leq 1.5\%$ wherein n represents a refractive index of the acrylic resin and W represents a percentage of water absorption of the acrylic resin, and wherein the lens satisfies the following expression:

$$0 \leq (d \times h)/|R_1 \times R_2 \times W| \leq 2$$

wherein d represents an on-axis thickness of the lens, $R_1$ represents a radius of curvature on an optical axis of the first surface (mm) of the lens, $R_2$ represents a radius of curvature on the optical axis of the second surface (mm) of the lens, and h represents an effective diameter (mm) on an incident side of the lens, said lens functioning as an objective lens in a laser optical system for an optical disk.

2. The lens of claim 1, wherein the acrylic resin has further a condition of:

$T \geq 110°$ C.

where T represents a thermal deformation temperature of the acrylic resin.

3. The lens of claim 2, wherein the thermal deformation temperature (T) is not more than 125° C.

4. The lens of claim 1, wherein a numerical aperture on an emitting side of the optical disk is not less than 0.3 and not more than 0.7.

5. The lens of claim 1, wherein a photoelasticity constant of the acrylic resin is not more than $6 \times 10^{-13}$ cm$^2$/dyne.

6. The lens of claim 1, wherein the lens is obtained by molding fused acrylic resin using a gate sectional area of not more than 3.1 mm$^2$.

7. The lens of claim 1, wherein the lens is obtained by molding fused acrylic resin under conditions having a ratio of a gate sectional area (mm$^2$) to a cubic volume (mm$^3$) of not more than 0.06 (mm$^{-1}$).

8. The lens of claim 1, wherein a melt flow rate of the acrylic resin is not less than 4 (g/10 min.) and not more than (g/10 min.).

* * * * *